US011233829B2

(12) United States Patent
Rappard et al.

(10) Patent No.: US 11,233,829 B2

(45) Date of Patent: Jan. 25, 2022

(54) DYNAMIC PER SUBSCRIBER POLICY ENABLEMENT FOR SECURITY PLATFORMS WITHIN SERVICE PROVIDER NETWORK ENVIRONMENTS

(71) Applicant: Palo Alto Networks, Inc., Santa Clara, CA (US)

(72) Inventors: Mitchell Rappard, Lee's Summit, MO (US); Leonid Burakovsky, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 16/748,629

(22) Filed: Jan. 21, 2020

(65) Prior Publication Data

US 2020/0162514 A1 May 21, 2020

Related U.S. Application Data

(63) Continuation of application No. 15/494,019, filed on Apr. 21, 2017, now Pat. No. 10,594,734.

(51) Int. Cl.

| | |
|---|---|
| ***H04L 29/06*** | (2006.01) |
| ***H04L 29/12*** | (2006.01) |
| ***H04W 24/08*** | (2009.01) |

(52) U.S. Cl.

CPC .......... *H04L 63/20* (2013.01); *H04L 61/2007* (2013.01); *H04L 63/0236* (2013.01); *H04L 63/0263* (2013.01); *H04L 63/10* (2013.01); *H04W 24/08* (2013.01)

(58) Field of Classification Search

CPC . H04L 63/20; H04L 61/2007; H04L 63/0263; H04L 63/0236; H04L 63/10; H04L 65/1069; H04L 65/105; H04L 65/80; H04L 65/1016; H04L 61/1523; H04W 24/08

See application file for complete search history.

(56) References Cited

U.S. PATENT DOCUMENTS 7,647,622 B1 * 1/2010 Sobel .................. H04L 63/1425 726/1
8,879,551 B2 11/2014 Anthony, Jr.
8,897,160 B2 11/2014 Anthony, Jr.
8,929,242 B2 1/2015 Anthony, Jr.

(Continued)

OTHER PUBLICATIONS

IP.com Search Query; Dec. 1, 2020 (Year: 2020).*

(Continued)

*Primary Examiner* — Samson B Lemma

*Assistant Examiner* — Blake I Narramore

(74) *Attorney, Agent, or Firm* — Van Pelt, Yi & James LLP

(57) ABSTRACT

Techniques for dynamic per subscriber policy enablement for security platforms within service provider network environments are disclosed. In some embodiments, a system/process/computer program product for dynamic per subscriber policy enablement for security platforms within service provider network environments includes monitoring network traffic on a service provider network at a security platform to identify a subscriber with a new IP flow; associating the subscriber with the new IP flow at the security platform; and determining a security policy to apply at the security platform to the new IP flow based on the subscriber.

20 Claims, 10 Drawing Sheets

(56) References Cited

U.S. PATENT DOCUMENTS 9,009,293 B2 4/2015 Batz
9,015,318 B1 4/2015 Batz
9,106,666 B2 8/2015 Omar
9,787,581 B2 10/2017 Dosovitsky
2008/0005798 A1* 1/2008 Ross ........................ H04L 63/08 726/26
2011/0032942 A1 2/2011 Matthews
2011/0219035 A1 9/2011 Korsunsky
2011/0231510 A1 9/2011 Korsunsky
2011/0289564 A1* 11/2011 Archer .................... G06F 21/40 726/5
2012/0136976 A1* 5/2012 Krishnan ............ H04L 61/2514 709/223
2013/0019277 A1 1/2013 Chang
2013/0247167 A1* 9/2013 Paul ...................... H04L 63/145 726/11
2013/0310030 A1* 11/2013 Ventimiglia ........ H04L 12/5692 455/434
2014/0123222 A1 5/2014 Omar
2014/0198650 A1 7/2014 Billau
2014/0233389 A1 8/2014 Bantukul
2014/0282823 A1* 9/2014 Rash ....................... H04L 63/20 726/1
2015/0067764 A1* 3/2015 Kim ...................... H04L 63/101 726/1
2015/0195760 A1* 7/2015 Sanz ................... H04W 12/068 370/230
2015/0264071 A1* 9/2015 Kojima ............... H04L 63/1416 726/12
2015/0288661 A1* 10/2015 Monk ................. H04L 63/0281 726/7
2015/0319138 A1* 11/2015 Yan ..................... H04L 63/1416 726/11
2015/0358891 A1* 12/2015 Bergstrom ............ H04W 48/08 370/329
2016/0006755 A1 1/2016 Donnelly
2016/0105446 A1 4/2016 Chen
2016/0330245 A1* 11/2016 Bell .................... H04L 63/1433
2017/0063859 A1* 3/2017 Shue ....................... H04L 47/14
2018/0295138 A1 10/2018 Harris

OTHER PUBLICATIONS

Google Patent Search Strings; Dec. 1, 2020 (Year: 2020).*

Author Unknown, General Packet Radio Service (GPRS) Enhancements for Evolved Universal Terrestrial Radio Access Network (E-UTRAN) Access (Release 14), 3rd Generation Partnership Project, Mar. 2017, 1-386.

Author Unknown, Securing LTE Networks—What, Why, and How, White Paper, Jan. 28, 2016.

Burakovsky, Don't Take Security for Granted, Wireless Week, Mar. 23, 2009, https://www.wirelessweek.com/article/2009/03/dont-take-security-granted.

Burakovsky, Dynamic Multi-Layered Defense—Part II—Why LTE Networks are Less Secure than their 3G Predecessors, The LTE World Series Blog, Sep. 29, 2014, https://lteconference.wordpress.com/2014/09/29/dynamic-multi-layered-defense-part-ii-why-lte-networks-are-less-secure-than-their-3g-predecessors/.

Burakovsky, Next Generation Service Provider Security: Dynamic Multi-Layered Defense for LTE Networks—Part 1, The LTE World Series Blog, Sep. 3, 2014, https://lteconference.wordpress.com/2014/09/03/next-generation-service-provider-security-dynamic-multi-layered-defense-for-lte-networks-part-1/.

Burakovsky, Next-Generation Service Provider Security—Dynamic Multi-Layered Defense, RCR Wireless News, Apr. 21, 2014, http://www.rcrwireless.com/20140421/network-infrastructure/wi-fi/reader-forum-next-generation-service-provider-security-dynamic-multi-layered-defense.

Chen et al., Extensible Authentication Protocol (EAP) and IEEE 802.1x: Tutorial and Empirical Experience, IEEE Radio Communications, Dec. 2005, S26-S32.

* cited by examiner

DYNAMIC PER SUBSCRIBER POLICY ENABLEMENT FOR SECURITY PLATFORMS WITHIN SERVICE PROVIDER NETWORK ENVIRONMENTS

CROSS REFERENCE TO OTHER APPLICATIONS

This application is a continuation of co-pending U.S. patent application Ser. No. 15/494,019 entitled DYNAMIC PER SUBSCRIBER POLICY ENABLEMENT FOR SECURITY PLATFORMS WITHIN SERVICE PROVIDER NETWORK ENVIRONMENTS filed Apr. 21, 2017 which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
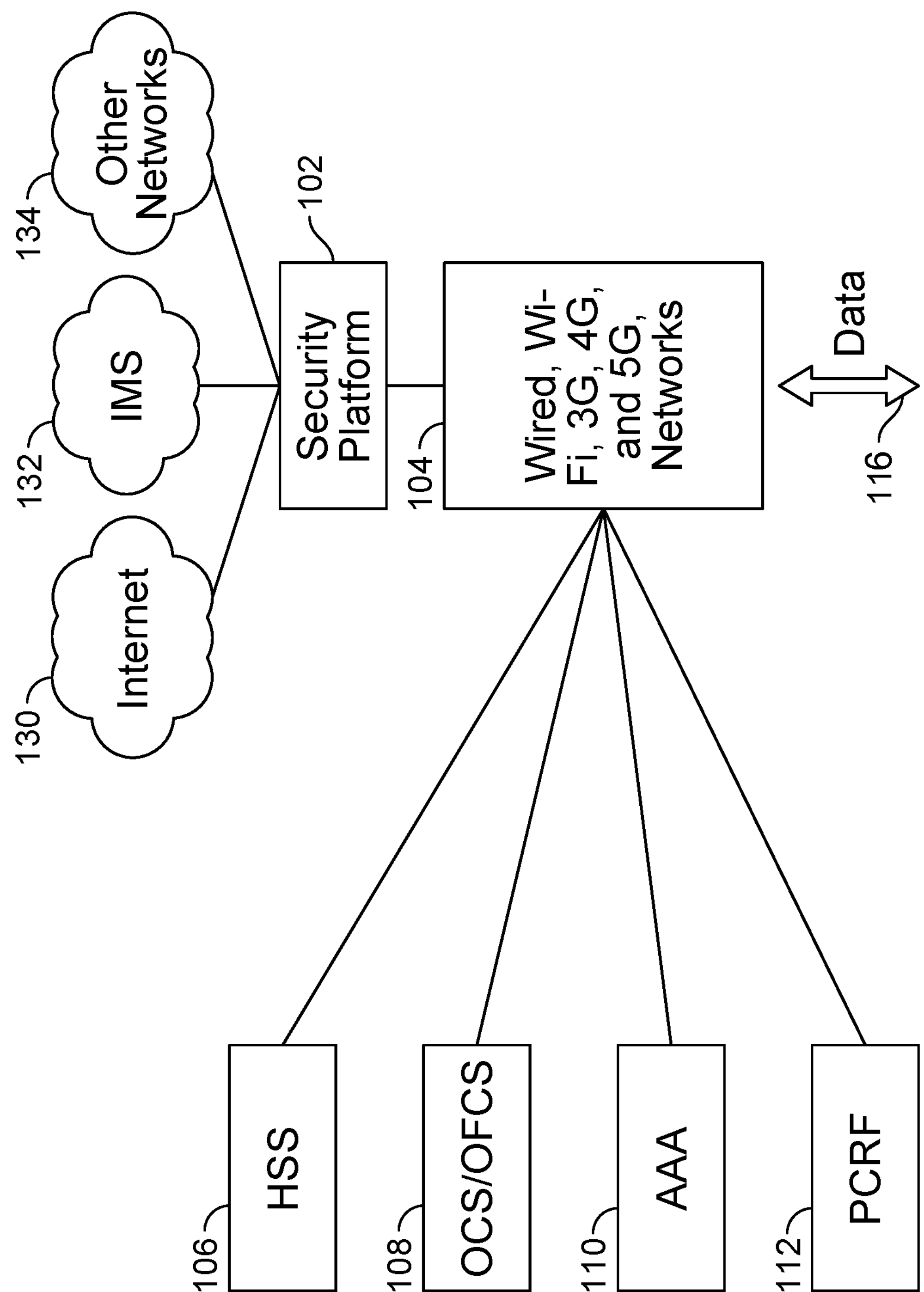
FIG. 1 is a block diagram illustrating an existing service provider network environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls and Palo Alto Networks' VM Series virtualized next generation firewalls).

For example, Palo Alto Networks' next generation firewalls enable enterprises and service providers to identify and control applications, users, and content—not just ports, IP addresses, and packets—using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Technical and Security Challenges with Service Provider Networks

FIG. 1 is a block diagram illustrating an existing service provider network environment. As shown, this example service provider network environment for a 3GPP/Long Term Evolution (LTE) Evolved Packet Core (EPC) network architecture includes Wired, Wi-Fi, 3G, 4G, and 5G networks 104 to facilitate data communications for subscribers as shown at 116 over the Internet 130, IP Multimedia (Core Network) Subsystem (IMS) networks 132, and/or other networks 134 via a security platform 102 (e.g., a firewall, a network sensor acting on behalf of the firewall, or another device/component that can implement security policies).

As also shown, the example service provider network of FIG. 1 includes a Home Subscriber Server (HSS) 106 to facilitate various 3GPP network accesses for subscribers as shown in FIG. 1. A Policy Control and Charging Rules Function (PCRF) 112 (e.g., a software component/node in the core network that determines policy rules) facilitates decision making procedures and can include information on the subscriber's permitted services, service preemption priorities, allowed Quality of Service (QoS), and charging related data. Additional network elements shown in FIG. 1 include an Authentication, Authorization, and Accounting (AAA) server 110 to enable device connectivity to services via the mobile core network or the EPC network. Online Charging System (OCS)/Offline Charging System (OFCS) 108 receives events (e.g., from the Policy and Charging Enforcement Function (PCEF), which is not shown in FIG. 1) and generates charging data records (CDRs) for the billing system (e.g., for the mobile core network or the EPC network).

However, in the example service provider network environment of FIG. 1, the service provider can only implement a static policy (e.g., the service provider cannot define a security/firewall policy on a per endpoint basis and/or a per flow basis), and any changes generally require network infrastructure updates. As such, security platform 102 (e.g., a firewall) is not in communication with any of the network elements (i.e., OCS/OFCS 106, AAA 108, PCRF 110, and HSS 112) as shown in FIG. 1.

Thus, technical and security challenges with service provider networks exist. As such, what are needed are new and improved security policy techniques for such service provider network environments. Specifically, what are needed are new and improved solutions for applying security policies (e.g., firewall policies) on service provider networks.

Overview of Techniques for Dynamic Per Subscriber Policy Enablement for Security Platforms within Service Provider Network Environments and for a Security Platform for Service Provider Network Environments Accordingly, techniques for dynamic per subscriber policy enablement for security platforms within service provider network environments are disclosed. Specifically, various system architectures for implementing and various processes for providing dynamic per subscriber policy enablement for security platforms within service provider network environments are disclosed. For example, the disclosed techniques facilitate applying security policies based on a user, application, and/or IP address using next generation firewalls on service provider networks, such as further described below.

When a mobile device attaches to the network (e.g., a 3GPP/LTE EPC network), the anchor gateway (e.g., the Packet Data Network (PDN) Gateway or PGW in a 3GPP/LTE EPC network) will generally query a Policy Charging Function and Control (PCRF) entity over the Gx interface to determine the policy for that subscriber. The PCRF entity will send back to the PGW information about, for example, QoS, filters, and/or other policy related information that is stored in the PCRF entity for that subscriber that is to be applied for this subscriber (e.g., the PCRF entity is generally used to manage/control bandwidth and QoS on wireless networks; and the AAA server is generally used for authentication purposes on wireless networks).

In one embodiment, the PCRF entity is configured to provide information about the security policies that are to be applied for each subscriber, and a security platform (e.g., next generation firewall, which can receive these messages or be configured to support another communication mechanism with the PCRF entity and/or other elements including the Traffic Detection Function (TDF) entity, Lightweight Directory Access Protocol (LDAP) server to obtain user information associated with an IP address, and/or various other elements in the service provider's network as further described below) maps the IP addresses associated with each of the subscribers (e.g., each of the subscribers' mobile devices) and is configured to enforce the security policies. Thus, service providers can use the disclosed techniques to configure and enforce different security policies applied to each subscriber/IP depending on the type of subscriber (e.g., on a per subscriber/IP basis).

For example, pre-paid, post-paid, and enterprise customers can each have different security profiles returned from the PCRF entity to the PGW. As another example, different policies can be applied for different Access Point Names (APNs) that the subscriber is attaching to. For instance, the internet APN and IMS APN can be configured to be associated with different security policies.

In one embodiment, a security platform (e.g., a firewall, a network sensor acting on behalf of the firewall, or another device/component that can implement security policies) is configured to use existing 3GPP and non-3GPP interfaces to dynamically apply security policies (e.g., granular security policies, which can be applied per subscriber/IP in real-time) as data calls are setup and/or modified using the disclosed techniques, such as further described below. For example, the security platform can be configured to dynamically apply security policy per IP flow for wireless and wired devices.

In one embodiment, a security platform is configured to listen to communications (e.g., passively monitor messages) to/from various network elements on the service provider network, such as the PCRF, AAA, LDAP servers, and/or TDF, such as further described below.

In one embodiment, a security platform is configured to communicate with (e.g., actively communicate messages with) various network elements on the service provider network, such as the PCRF, AAA, LDAP servers, and/or TDF, such as further described below.

In one embodiment, a security platform is configured to communicate with an orchestrator, in which the orchestrator communicates with (e.g., actively communicates messages with) various network elements on the service provider network, such as the PCRF, AAA, LDAP servers, and/or TDF, such as further described below.

In one embodiment, based on these messages (e.g., determined using the disclosed passive monitoring, active communications, or using an orchestrator for active communications), the security platform is configured with security policies for each of the IP addresses used by each device/subscriber.

In one embodiment, these messages are existing and/or standard messages as used in current 3GPP/LTE EPC network environments, and the security platform is configured to infer security policies from these messages.

In one embodiment, these messages are altered to include new information specific to security policies and the security platform is configured to process these altered messages to determine and enforce security policies based on these altered messages.

In one embodiment, the security platform performs active and/or passive techniques to discover IP address and security policy related information for mapping a subscriber/IP address to a security policy for enforcement.

In one embodiment, a subscriber/IP address is associated with (e.g., mapped to) a security policy to facilitate security policy enforcement per IP flow using the security platform (e.g., a next generation firewall (NGFW)).

In one embodiment, a security platform is configured to monitor and/or communicate on SGi, Gi, S5, S8, and/or other interfaces where wired and wireless network traffic flow.

In one embodiment, a new Gx Attribute Value Pair (AVP) (e.g., a new AVP on the Gx interface) is used to define a security policy (e.g., Rule-Base-Name can be used as an implicit indicator (overloading the AVP names to be used implicitly) for security policy purposes or can use new AVP names that are used exclusively for security policy purposes).

In an example implementation for a 3GPP/LTE EPC network, the security platform is configured to monitor traffic on the Gx interface (e.g., DIAMETER Gx traffic) to/from the PCRF entity as well as the GTP-C traffic to/from the PGW to facilitate mapping this information to the IP address assigned to the subscriber by the PGW. In this example implementation, the communications between the PCRF entity and PGW (e.g., and/or communications between other elements including the Traffic Detection Function (TDF) entity, Lightweight Directory Access Protocol (LDAP) server, and/or various other elements in the service provider's network as further described below) can be passively monitored such that the security platform passively listens to the communications between the PCRF entity and PGW in order to perform security policy enforcement per subscriber/IP.

In another example implementation for a 3GPP/LTE EPC network, the security platform is configured to communicate with one or more network elements (e.g., entities or nodes) of the 3GPP/LTE EPC network to facilitate mapping a security policy to the IP address assigned to the subscriber. In this example implementation, the security platform actively communicates with the HSS, OCS/OFCS, AAA server, and/or PCRF entity (e.g., and/or other elements including the Traffic Detection Function (TDF) entity, Lightweight Directory Access Protocol (LDAP) server, and/or various other elements in the service provider's network as further described below) to obtain information about the security policies that are to be applied for each subscriber (e.g., via parameters sent over standardized interfaces, where the nature of the parameters and the protocols used for those interfaces are defined by standards bodies such as 3GPP or IETF, messages, an Application Programming Interface (API) such as REST APIs, a network protocol, and/or another communication mechanism), and the security platform can then implement such security policies per subscriber/IP.

In yet another example implementation for a 3GPP/LTE EPC network, the security platform is configured to communicate with an orchestrator element (e.g., entity or node), and the orchestrator is configured to communicate with one or more network elements (e.g., entities or nodes) of the 3GPP/LTE EPC network to facilitate mapping a security policy to the IP address assigned to the subscriber. In this example implementation, the security platform communicates with the orchestrator element to obtain information about the security policies that are to be applied for each subscriber (e.g., using push and/or pull communications with the orchestrator, in which such push and/or pull communications can be implemented using messages, APIs such as REST APIs, a network protocol, and/or another communication mechanism), in which the orchestrator element is responsible for actively communicating with the HSS, OCS/OFCS, AAA server, and/or PCRF entity (e.g., and/or other elements including the Traffic Detection Function (TDF) entity, Lightweight Directory Access Protocol (LDAP) server, and/or various other elements in the service provider's network as further described below) (e.g., via parameters sent over standardized interfaces, where the nature of the parameters and the protocols used for those interfaces are defined by standards bodies such as 3GPP or IETF, messages, APIs such as REST APIs, and/or another communication mechanism), and the security platform can then implement such security policies per subscriber/IP.

As such, service providers can use the disclosed techniques to configure and enforce different security policies applied to each subscriber/IP depending on the type of subscriber. Thus, rather than simply mapping a APN/PDN to a zone/policy for security, the disclosed techniques can be used to map a subscriber/IP address to a security policy to facilitate security policy enforcement per IP flow using a security platform (e.g., a next generation firewall (NGFW)). For example, service providers can use the disclosed techniques to configure granular security policies that can be applied on a per-subscriber and per APN basis instead of broad policies that typically apply to every subscriber and every PDN (Packet Data Network). They are also given this ability via network elements (e.g. PCRF) that already exist in their network, which they understand and want to leverage.

Accordingly, various techniques for providing for dynamic per subscriber policy enablement for security platforms within service provider network environments are disclosed. For example, various techniques for providing for dynamic per subscriber policy enablement for security platforms within service provider network environments using passive monitoring techniques are disclosed. As another example, various techniques for providing for dynamic per subscriber policy enablement for security platforms within service provider network environments using active monitoring techniques are disclosed. As will be apparent to one skilled in the art in view of the various techniques and embodiments described herein, the various techniques described herein for providing for dynamic per subscriber policy enablement for security platforms within service provider network environments can similarly be performed using cloud-based security solutions, network device-based security solutions, virtualized/software-defined networking (SDN)-based security solutions to enforce security policies per subscriber/IP, and/or combinations or hybrid implementations of the aforementioned including a security platform as further described herein, such as further described below with respect to various embodiments.

Figure 2:
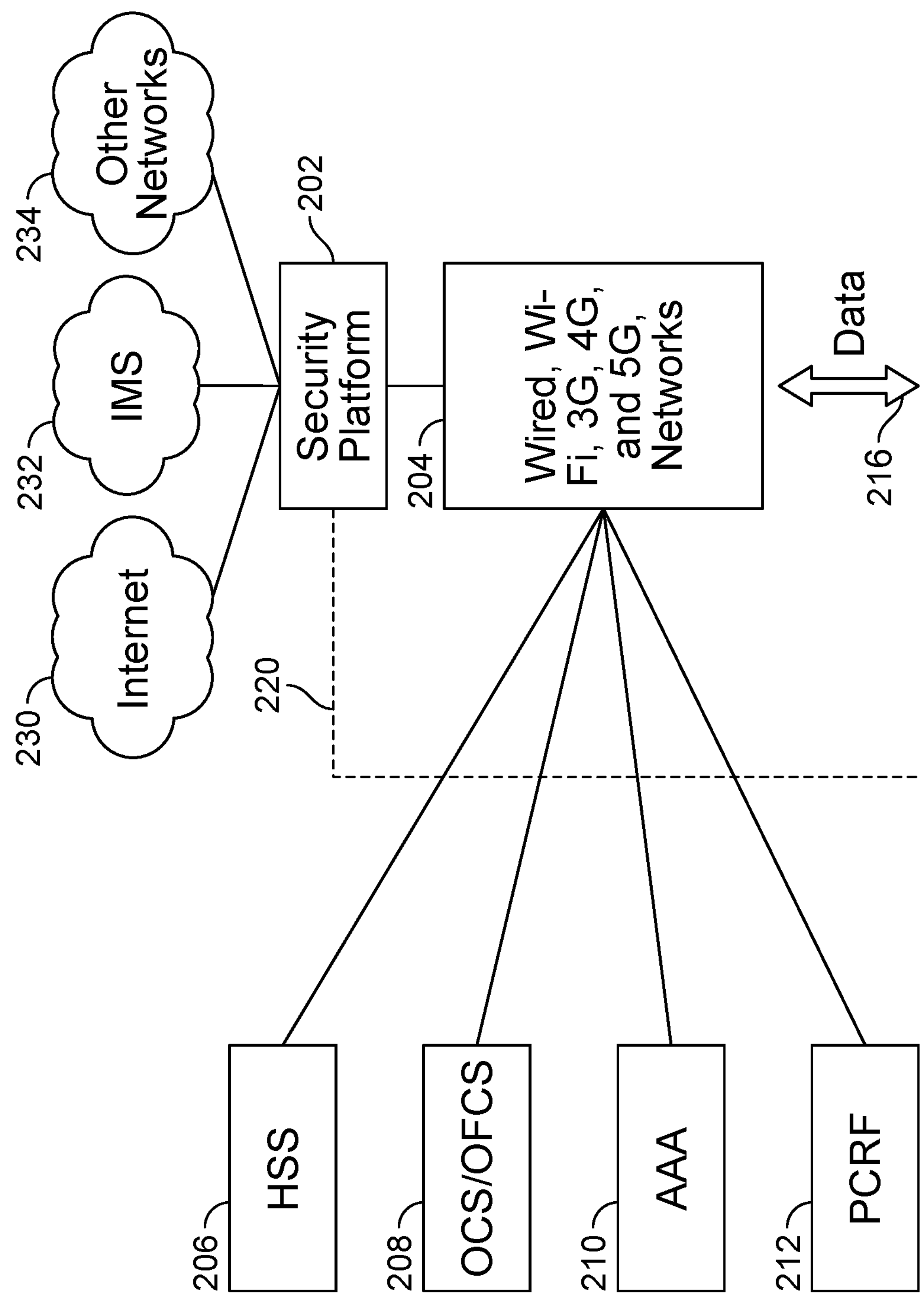
FIG. 2 is a block diagram illustrating a system architecture that includes a security platform that performs passive monitoring techniques for providing dynamic per subscriber policy enablement for security platforms within service provider network environments in accordance with some embodiments.

Example System Architectures for Implementing Dynamic Per Subscriber Policy Enablement for Security Platforms within Service Provider Network Environments FIG. 2 is a block diagram illustrating a system architecture that includes a security platform that performs passive monitoring techniques for providing dynamic per subscriber policy enablement for security platforms within service provider network environments in accordance with some embodiments. As shown, FIG. 2 illustrates a service provider network environment for a 3GPP/Long Term Evolution (LTE) Evolved Packet Core (EPC) network architecture that includes Wired, Wi-Fi, 3G, 4G, and 5G networks 204 to facilitate data communications for subscribers as shown at 216 over the Internet 230, IP Multimedia (Core Network) Subsystem (IMS) networks 232, and/or other networks 234 via a security platform 202 (e.g., a firewall, a network sensor acting on behalf of the firewall, or another device/component that can implement security policies).

As also shown, the service provider network of FIG. 2 includes an HSS 206 that is in communication with an Authentication, Authorization, and Accounting (AAA) server 210 to enable device connectivity to services via the mobile core network or the EPC network. Online Charging System (OCS)/Offline Charging System (OFCS) 208 receives events (e.g., from the Policy and Charging Enforcement Function (PCEF), which is not shown in FIG. 2) and generates charging data records (CDRs) for the billing system (e.g., for the mobile core network or the EPC network).

As also shown in the example service provider network of FIG. 2, a security platform 202 is configured to passively monitor (e.g., passively listen) to communications between various network elements (e.g., entities or nodes) on the service provider network for providing dynamic per subscriber policy enablement for security platforms within service provider network environments, as further described below. Specifically, security platform 202 is configured to monitor (e.g., passively listen) to communications between Wired, Wi-Fi, 3G, 4G, and 5G networks 204 (e.g., which can include PGW, Gateway GPRS (General Packet Radio Service) Support Node (GGSN), routers, and/or other gateway elements) and various network elements (e.g., entities or nodes) of the service provider network including HSS 206, OCS/OFCS 208, AAA 210, and PCRF 212 as shown at 220 of FIG. 2.

In an example implementation, security platform 202 is configured to monitor traffic on the Gx interface (e.g., DIAMETER Gx traffic) to/from the PCRF entity shown as PCRF 212 in FIG. 2 as well as the GTP-C traffic to/from the PGW or GGSN (e.g., shown as Wired, Wi-Fi, 3G, 4G, and 5G networks 204 in FIG. 2) to facilitate mapping a security policy to the IP address assigned to the subscriber by the PGW. In this example implementation, the communications between the PCRF entity and PGW can be passively monitored such that the security platform passively listens to the communications between the PCRF entity and PGW as shown at 220 in FIG. 2 in order to perform security policy enforcement per subscriber/IP (e.g., the security platform can enforce distinct security policies per endpoint IP address(es)). In addition, security platform 202 can also be configured to monitor the network traffic to/from the other entities shown as HSS 206, OCS/OFCS 208, AAA 210, and PCRF 212 in FIG. 2 as well as the network traffic to/from the PGW or other anchors/gateways (e.g., shown as Wired, Wi-Fi, 3G, 4G, and 5G networks 204 in FIG. 2) as shown at 220 in FIG. 2 in order to perform security policy enforcement per subscriber/IP as will now be apparent to one of ordinary skill in the art.

Figure 3:
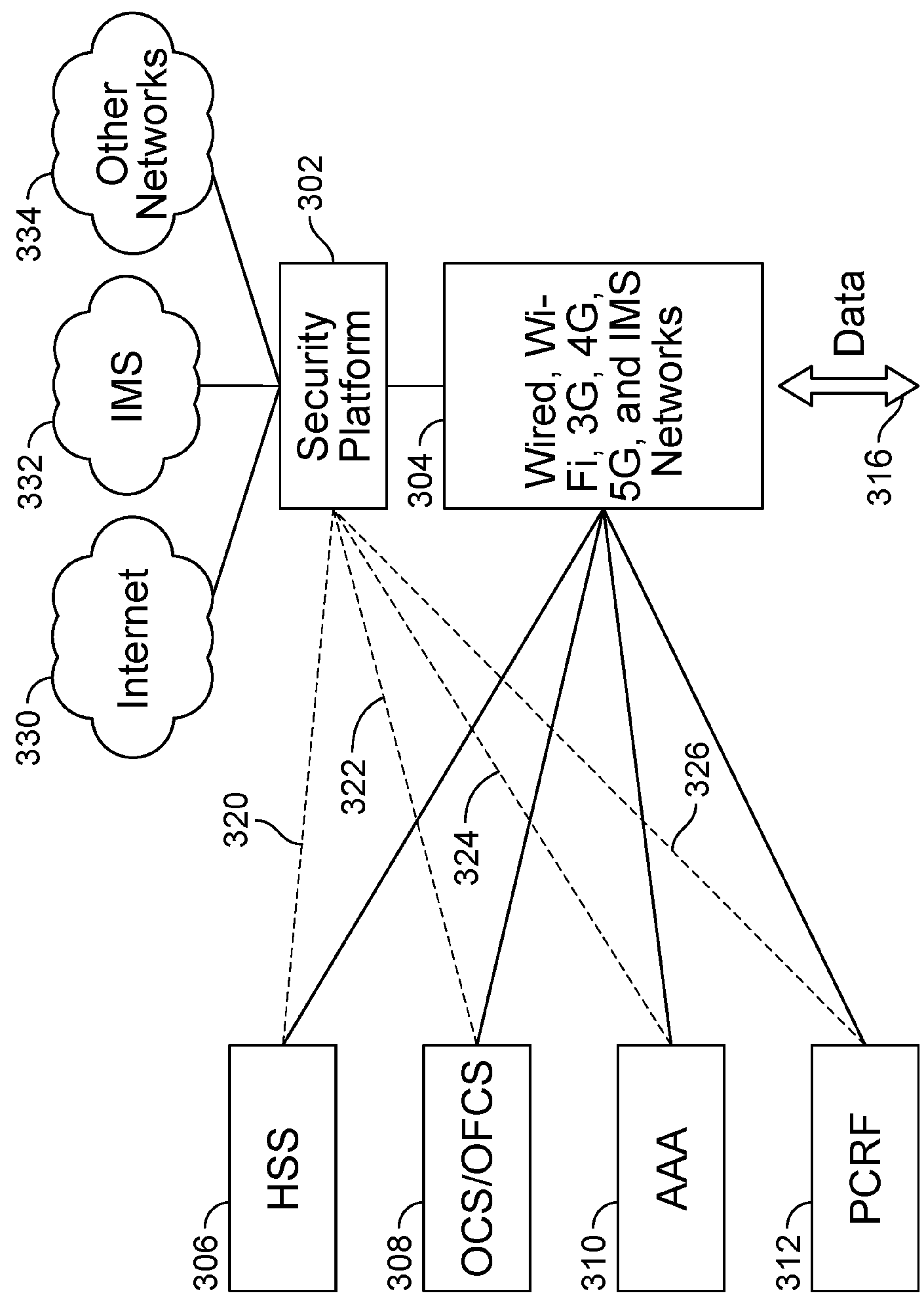
FIG. 3 is a block diagram illustrating another system architecture that includes a security platform that performs active communications techniques for providing dynamic per subscriber policy enablement for security platforms within service provider network environments in accordance with some embodiments.

Example System Architectures for Implementing a Security Platform for Service Provider Network Environments FIG. 3 is a block diagram illustrating another system architecture that includes a security platform that performs active communications techniques for providing dynamic per subscriber policy enablement for security platforms within service provider network environments in accordance with some embodiments. As shown, FIG. 3 illustrates another service provider network environment for a 3GPP/LTE EPC network architecture that includes Wired, Wi-Fi, 3G, 4G, and 5G networks 304 to facilitate data communications for subscribers as shown at 316 over the Internet 330, IP Multimedia (Core Network) Subsystem (IMS) networks 332, and/or other networks 334 via a security platform 302 (e.g., a firewall, a network sensor acting on behalf of the firewall, or another device/component that can implement security policies that is capable of performing a security policy per endpoint and/or flow).

In the system architecture for the service provider network environment of FIG. 3, a security platform 302 is configured to communicate (e.g., actively communicate) with various network elements (e.g., entities or nodes) on a service provider network for providing dynamic per subscriber policy enablement for security platforms within service provider network environments, such as shown in FIG. 3 and further described below. Specifically, security platform 302 is configured to communicate (e.g., actively communicate using push and/or pull communication techniques) with various network elements (e.g., entities or nodes) of the service provider network including HSS 306, OCS/OFCS 308, AAA 310, and PCRF, as shown at 320, 322, 324, and 326, respectively, of FIG. 3. For example, the security platform can receive communication from one or more PCC/AAA/HSS network elements and can also send real-time information to the PCC/AAA/HSS as further described below.

Referring to FIG. 3, which is for a 3GPP/LTE EPC network, security platform 302 is configured to communicate with one or more network elements (e.g., entities or nodes) of the 3GPP/LTE EPC network to facilitate mapping a security policy to the IP address assigned to the subscriber. In this example implementation, the security platform actively communicates with each of HSS 306, OCS/OFCS 308, AAA server 310, and/or PCRF 312 to obtain information about the security policies that are to be applied for each subscriber (e.g., via parameters sent over standardized interfaces, where the nature of the parameters and the protocols used for those interfaces are defined by standards bodies such as 3GPP or IETF, messages, APIs such as REST APIs, a network protocol, and/or another communication mechanism), and the security platform can then implement such security policies per subscriber/IP (e.g., the security platform can enforce distinct security policies per endpoint IP address(es)).

Figure 4:
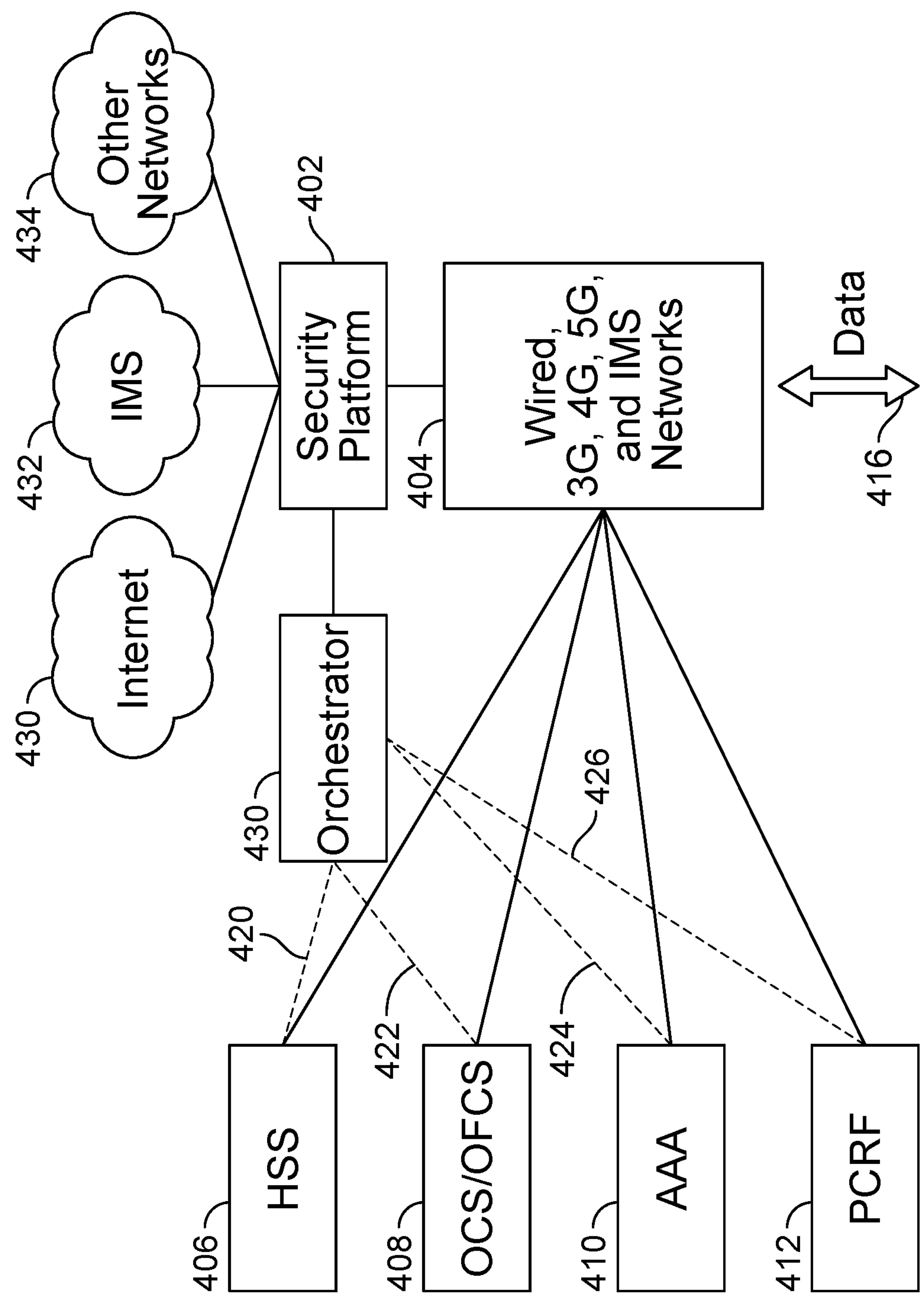
FIG. 4 is a block diagram illustrating another system architecture that includes a security platform configured to communicate with an orchestrator for providing dynamic per subscriber policy enablement for security platforms within service provider network environments in accordance with some embodiments.

FIG. 4 is a block diagram illustrating another system architecture that includes a security platform configured to communicate with an orchestrator for providing dynamic per subscriber policy enablement for security platforms within service provider network environments in accordance with some embodiments. As shown, FIG. 4 illustrates another service provider network environment for a 3GPP/LTE EPC network architecture that includes Wired, Wi-Fi, 3G, 4G, and 5G networks 404 to facilitate data communications for subscribers as shown at 416 over the Internet 430, IP Multimedia (Core Network) Subsystem (IMS) networks 432, and/or other networks 434 via a security platform 402 (e.g., a firewall, a network sensor acting on behalf of the firewall, or another device/component that can implement security policies that is capable of performing a security policy per endpoint and/or flow).

In the system architecture for the service provider network environment of FIG. 4, a security platform 402 is configured to communicate (e.g., push/pull communications) with an orchestrator 430 on a service provider network for providing dynamic per subscriber policy enablement for security platforms within service provider network environments, such as shown in FIG. 4 and further described below. Specifically, security platform 402 is configured to communicate (e.g., push/pull communications) with orchestrator 430 for providing dynamic per subscriber policy enablement for security platforms within service provider network environments (e.g., a policy node, such as a policy decision point is provided by such an orchestrator node, which can be implemented as a Mobile Orchestration Gateway (MOG) or another orchestration system that includes or does not include PCR node functions), in which orchestrator 430 is configured to communicate (e.g., actively communicates using push and/or pull communication techniques) with various network elements (e.g., entities or nodes) of the service provider network including HSS 406, OCS/OFCS 408, AAA 410, and PCRF 412 as shown at 420, 422, 424, and 426, respectively, of FIG. 4.

Referring to FIG. 4, which is for a 3GPP/LTE EPC network, security platform 402 is configured to communicate with orchestrator 430 (e.g., entity or node), and orchestrator 430 is configured to communicate with one or more network elements (e.g., entities or nodes) of the 3GPP/LTE EPC network to facilitate mapping a security policy to the IP address assigned to the subscriber. In this example implementation, the security platform actively communicates with the orchestrator element to obtain information about the security policies that are to be applied for each subscriber (e.g., via parameters sent over standardized interfaces, where the nature of the parameters and the protocols used for those interfaces are defined by standards bodies such as 3GPP or IETF, messages, APIs such as REST APIs, a network protocol, and/or another communication mechanism), in which the orchestrator element is responsible for actively communicating with the HSS, OCS/OFCS, AAA server, PCRF entity, and/or PGW (e.g., via parameters sent over standardized interfaces, where the nature of the parameters and the protocols used for those interfaces are defined by standards bodies such as 3GPP or IETF, messages, APIs such as REST APIs, and/or another communication mechanism), and the security platform can then implement such security policies per subscriber/IP (e.g., the security platform can enforce distinct security policies per endpoint IP address(es)).

While the disclosed techniques are described above with reference to the example service provider network environments shown in FIGS. 2, 3, and 4 for a 3GPP/LTE EPC network architecture, the disclosed techniques can similarly be applied in various other wireless network architectures for a service provider network as will now be apparent to one of ordinary skill in the art.

Example Use Case Scenarios

The disclosed techniques for providing dynamic per subscriber policy enablement for security platforms within service provider network environments can be applied in a variety of use case scenarios for facilitating enhanced and more flexible and dynamic subscriber security. Example use case scenarios will be further described below.

As a first example use case scenario, a subscriber, Alice, signs up for enhanced security through her service provider (e.g., AT&T®, T-Mobile®, Verizon®, or another service provider), and the security platform dynamically applies a new security policy based on information sent from the PCRF or another node(s) in the service provider's network or a new node (e.g., a policy node, such as a policy decision point, referred to herein as an orchestrator node, is used for discovery of the enhanced security policy for Alice). In this example use case scenario, the security platform dynamically applies (e.g., in near real-time) the enhanced security policy to Alice's devices' assigned IPs on her service provider's network without requiring any configuration changes on the security platform (e.g., (upgraded) URL filtering, malware content protection, and/or other security policies associated with the enhanced security through her service provider can be dynamically applied).

As a second example use case scenario, a user, Alice, upgrades from a pre-paid to post-paid subscription through her service provider. Once the user's plan is changed, the PCRF sends a Re-Auth Request (RAR) command to the EPC (e.g., and/or another node(s) in the service provider's network or a new node, such as the above-described orchestrator, is utilized for discovery of this upgrade for Alice). In this example use case scenario, the security platform uses information from that RAR to dynamically modify the security policy applied to any active IP flows associated with Alice's devices on her service provider's network without requiring any configuration changes on the security platform (e.g., (upgraded) URL filtering, malware content protection, and/or other security policies associated with the post-paid subscription through her service provider can be dynamically applied).

As a third example use case scenario, an operator, Bob, determines to utilize a new security policy for certain applications/services, such as Facebook®, Twitter®, BitTorrent®, and Netflix®, for a specific data plan on the service provider's network. The security platform discovers these different security policies from the PCRF (e.g., for wireless connections) and AAA server (e.g., for Wi-Fi connections) (e.g., and/or or another node(s) in the service provider's network or a new node, such as the above-described orchestrator, is utilized for discovery of these different security policies). As such, the new security policy is dynamically applied (e.g., in near real-time) for the correct users without requiring any configuration changes on the security platform by Bob (e.g., or other network/security administrators for the service provider).

As a fourth example use case scenario, a user, Charlie, logs into a Wi-Fi network using Extensible Authentication Protocol (EAP) authentication. In this case, the message that the security platform can inspect is an Access Request message from the Wi-Fi Access Point (AP) or controller to the AAA server (e.g., or for RADIUS, a Radius-Access Request message sent to an authentication server (RADIUS)). In this example use case scenario, the security platform can enforce a different security policy based on the user and the RADIUS attributes seen during authentication. In an example implementation, examples of attributes that a security platform can inspect using the disclosed techniques in order to determine policy for that client include the following RADIUS attributes: code 1/User-Name (e.g., the IP address of the client), code 8/Framed-IP-Address (e.g., the username used to authenticate (e.g., Charlie)), Code 25/Class (e.g., a multipurpose field that can be used for various purposes), and/or Code 26/Vendor-Specific (e.g., a vendor specific field that can be used for various purposes). Based on inspection of one or more of these fields (e.g., and/or others), the security platform can determine a security profile (e.g., a security policy) to apply for this client/user.

As a fifth example use case scenario, a Voice over LTE (VoLTE) user, Daniel, (e.g., AT&T and Verizon subscribers are calling via VoLTE) can have his mobile device infected by malware, and the malware executed on his infected mobile device can attack its own network VoLTE service nodes, such as a Proxy-Call Session Control Function (P-CSCF) for example (e.g., which is part of the IMS system). Specifically, REGISTER messages can be sent directly from user equipment (e.g., can be a mobile device that was infected by malware, such as Daniel's infected mobile phone) directly to the P-CSCF. The message itself can be legitimate, but in this case, it is just not Daniel who is sending this message, but rather it is the malware executing on Daniel's mobile phone that initiated the sending of this message. The malware can send a significant number of REGISTER messages to the P-CSCF as an attack designed to congest the signaling network and cause a VoLTE service outage on the service provider's network. In this example use case scenario, when the P-CSCF determines that this is an attack (e.g., the P-CSCF can be configured to detect such an attack based on a threshold number of REGISTER messages from a specific client(s) within a predetermined period of time, in which the security platform is configured to detect such a REGISTER flood and apply a security policy in response to detection of the REGISTER flood), then the P-CSCF can directly, or via the PCRF entity and/or via the orchestrator, communicate (e.g., using a push communication) and inform the security platform of this detected attack.

In an example implementation, the notification can be provided using an API (e.g., an XML API that uses standard HTTP requests to send and receive data, such as supported by PAN-OS for commercially available security solutions available from Palo Alto Networks, Inc.) or other communication mechanisms to provide the notification of this detected attack to the orchestration and security layers for the service provider network, which can include the IP (or IPs) or the user equipment (e.g., mobile phones or Internet of Things (IoT)) that the detected attack is coming from on the signaling layer. The security platform layer (e.g., which can include a Network Gateway FireWall Manager (NGFWM) for managing NGFW devices of the security platform layer for the service provider network(s), in which the NGFWM can be implemented using commercially available management solutions available from Palo Alto Networks, Inc. for managing multiple network devices/firewalls, such as the Panorama™ network security management for centralized device management that enables users to centrally manage the process of configuring network devices, deploying security policies, performing forensic analysis, and generating reports across an entire network of NGFWs and is available as either a virtual appliance or a dedicated management platform) can receive this API call or other communication mechanism providing the notification of this detected attack and enforce/prevent this attack (e.g., using a "Dynamic Address List" as the security/firewall mechanism of dynamically real-time changing of the security policy).

Figure 5:
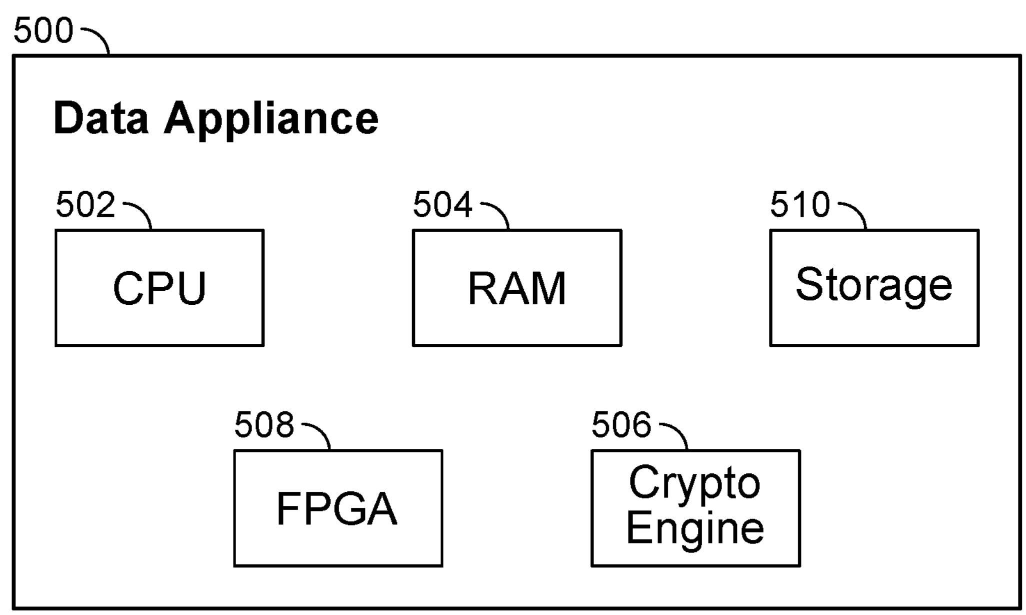
FIG. 5 is a functional diagram of hardware components of a network device for performing security policy enforcement on service provider network environments in accordance with some embodiments.

Example Hardware Components of a Network Device for Performing Security Policy Enforcement on Service Provider Networks FIG. 5 is a functional diagram of hardware components of a network device for performing security policy enforcement on service provider network environments in accordance with some embodiments. The example shown is a representation of physical/hardware components that can be included in network device 500 (e.g., an appliance, gateway, or server). Specifically, network device 500 includes a high performance multi-core CPU 502 and RAM 504. Network device 500 also includes a storage 510 (e.g., one or more hard disks or solid state storage units), which can be used to store policy and other configuration information as well as signatures. In one embodiment, storage 510 stores subscriber information and associated IP addresses and possibly other information that are monitored for implementing the disclosed security policy enforcement techniques using a security platform/firewall device. Network device 500 can also include one or more optional hardware accelerators. For example, network device 500 can include a cryptographic engine 506 configured to perform encryption and decryption operations, and one or more FPGAs 508 configured to perform signature matching, act as network processors, and/or perform other tasks.

Figure 6:
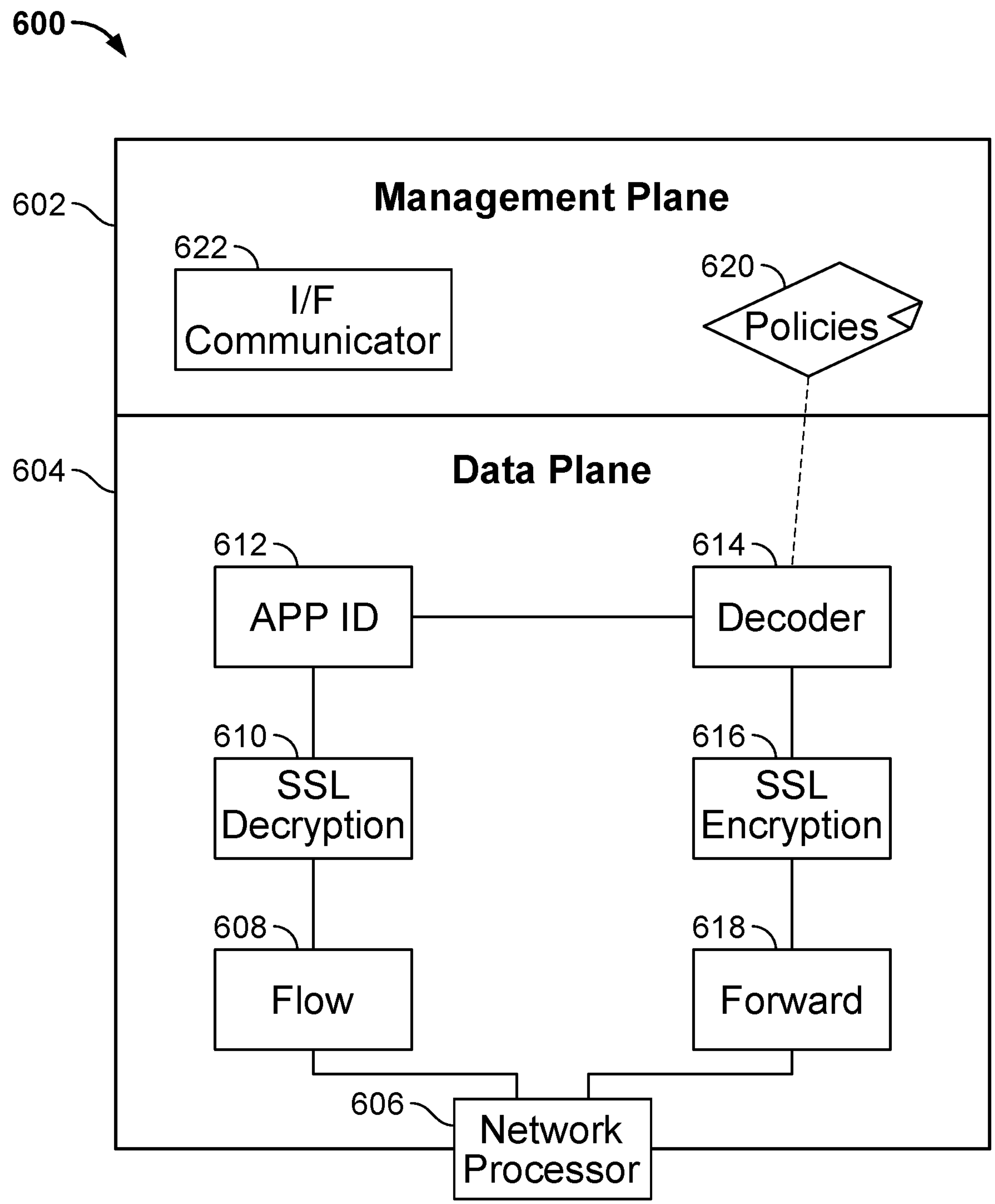
FIG. 6 is a functional diagram of logical components of a network device for performing security policy enforcement on service provider network environments in accordance with some embodiments.

Example Logical Components of a Network Device for Performing Security Policy Enforcement on Service Provider Networks FIG. 6 is a functional diagram of logical components of a network device for performing security policy enforcement on service provider network environments in accordance with some embodiments. The example shown is a representation of logical components that can be included in network device 600 (e.g., a data appliance, which can implement the disclosed security platform and perform the disclosed techniques). As shown, network device 600 includes a management plane 602 and a data plane 604. In one embodiment, the management plane is responsible for managing user interactions, such as by providing a user interface for configuring policies and viewing log data. The data plane is responsible for managing data, such as by performing packet processing and session handling.

Suppose a mobile device attempts to access a resource (e.g., a remote web site/server or another resource) using an encrypted session protocol, such as SSL. Network processor 606 is configured to monitor packets from the mobile device, and provide the packets to data plane 604 for processing. Flow 608 identifies the packets as being part of a new session and creates a new session flow. Subsequent packets will be identified as belonging to the session based on a flow lookup. If applicable, SSL decryption is applied by SSL decryption engine 610 using various techniques as described herein. Otherwise, processing by SSL decryption engine 610 is omitted. Application identification (APP ID) module 612 is configured to determine what type of traffic the session involves and to identify a user associated with the traffic flow. For example, APP ID 612 can recognize a GET request in the received data and conclude that the session requires an HTTP decoder. For each type of protocol, there exists a corresponding decoder 614. In one embodiment, the application identification is performed by an application identification module (e.g., APP-ID engine), and a user identification is performed by another function/engine. Based on the determination made by APP ID 612, the packets are sent to an appropriate decoder 614. Decoder 614 is configured to assemble packets (e.g., which may be received out of order) into the correct order, perform tokenization, and extract out information. Decoder 614 also performs signature matching to determine what should happen to the packet. SSL encryption engine 616 performs SSL encryption using various techniques as described herein and the packets are then forwarded using a forward component 618 as shown. As also shown, policies 620 are received and stored in the management plane 602. In one embodiment, policy enforcement (e.g., policies can include one or more rules, which can be specified using domain and/or host/server names, and rules can apply one or more signatures or other matching criteria or heuristics, such as for security policy enforcement for subscriber/IP flows on service provider networks as disclosed herein) is applied as described herein with respect to various embodiments based on the monitored, decrypted, identified, and decoded session traffic flows.

As also shown in FIG. 6, an interface (I/F) communicator 622 is also provided for security platform manager communications (e.g., via (REST) APIs, messages, or network protocol communications or other communication mechanisms) and/or with one or more network elements (e.g., an orchestrator, 3GPP network elements, and/or non-3GPP network elements as similarly described herein) on the service provider network (e.g., via (REST) APIs, messages, or network protocol communications or other communication mechanisms). In some cases, network communications of other network elements on the service provider network are monitored using network device 600, and data plane 604 supports decoding of such communications (e.g., network device 600, including I/F communicator 622 and decoder 614, can be configured to monitor and/or communicate on SGi, Gi, S5, S8, and/or other interfaces where wired and wireless network traffic flow exists as similarly described herein). As such, network device 600 including I/F communicator 622 can be used to implement the disclosed techniques for security policy enforcement on service provider networks as described above and as will be further described below.

Additional example processes for the disclosed techniques for performing dynamic per subscriber policy enablement for security platforms within service provider network environments will now be described.

Figure 7:
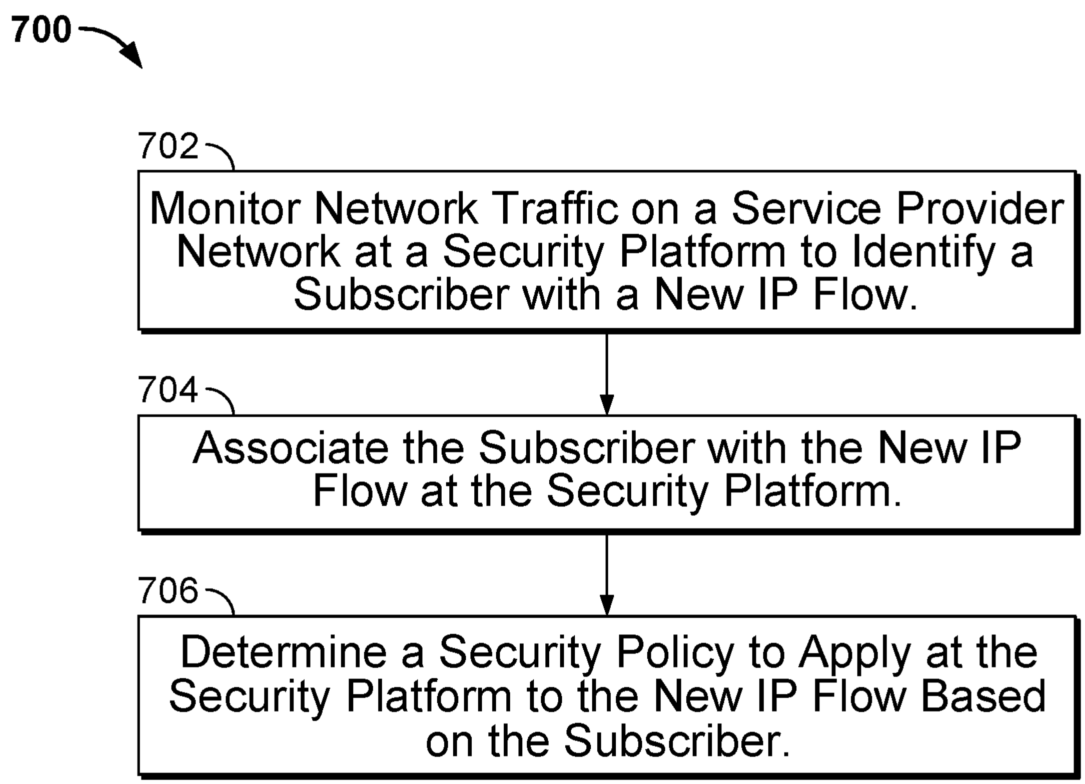
FIG. 7 is a flow diagram of a process for performing dynamic per subscriber policy enablement for security platforms within service provider network environments in accordance with some embodiments.

Example Processes for Performing Dynamic Per Subscriber Policy Enablement for Security Platforms within Service Provider Network Environments FIG. 7 is a flow diagram of a process for performing dynamic per subscriber policy enablement for security platforms within service provider network environments in accordance with some embodiments. In some embodiments, a process 700 as shown in FIG. 7 is performed by the security platform and techniques as similarly described above including the embodiments described above with respect to FIGS. 2, 5, and 6. In one embodiment, process 700 is performed by data appliance 500 as described above with respect to FIG. 5, network device 600 as described above with respect to FIG. 6, a virtual appliance, an SDN security solution, a cloud security service, and/or combinations or hybrid implementations of the aforementioned as described herein.

The process begins at 702. At 702, monitoring network traffic on a service provider network at the security platform to identify a subscriber associated with a new IP flow is performed. For example, the security platform (e.g., a firewall, a network sensor acting on behalf of the firewall, or another device/component that can implement security policies) can passively listen to network traffic (e.g., the security platform monitors wireless and wired interfaces including a plurality of 3GPP interfaces and a plurality of non-3GPP interfaces to apply a plurality of security policies in real-time as data calls are setup and modified on the service provider network) on the service provider network to identify new IP flows (e.g., data calls or other sessions) as similarly described above.

At 704, associating the subscriber with the new IP flow at the security platform is performed. For example, the security platform can identify new IP flows (e.g., data calls or other sessions) and associate a subscriber and their assigned IP address with the new flow as similarly described above.

At 706, determining a security policy to apply at the security platform to the new IP flow based on the subscriber is performed. For example, the security platform can apply dynamic policy per IP flow for wireless and wired devices, in which the security platform is configured with a plurality of security policies for IP addresses associated with a plurality of subscribers using the service provider network, such as similarly described above.

Figure 8:
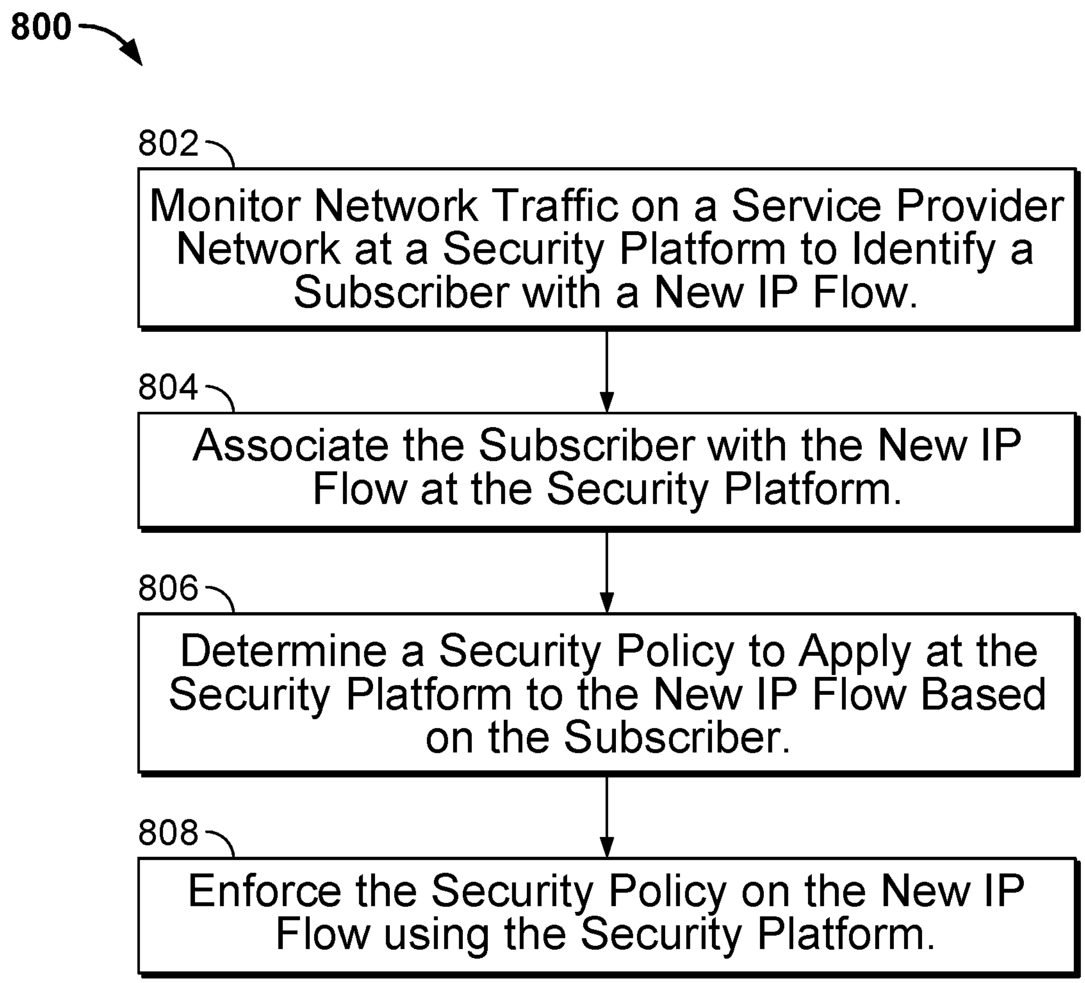
FIG. 8 is a flow diagram of a process for performing dynamic per subscriber policy enablement for security platforms within service provider network environments in accordance with some embodiments.

FIG. 8 is a flow diagram of a process for performing dynamic per subscriber policy enablement for security platforms within service provider network environments in accordance with some embodiments. In some embodiments, a process 800 as shown in FIG. 8 is performed by the security platform and techniques as similarly described above including the embodiments described above with respect to FIGS. 2, 5, and 6. In one embodiment, process 800 is performed by data appliance 500 as described above with respect to FIG. 5, network device 600 as described above with respect to FIG. 6, a virtual appliance, an SDN security solution, a cloud security service, and/or combinations or hybrid implementations of the aforementioned as described herein.

The process begins at 802. At 802, monitoring network traffic on a service provider network at the security platform to identify a subscriber associated with a new IP flow is performed. For example, the security platform (e.g., a firewall, a network sensor acting on behalf of the firewall, or another device/component that can implement security policies) can passively listen to network traffic on the service provider network to identify new IP flows (e.g., data calls or other sessions) as similarly described above. In an example implementation, the security platform monitors network traffic (e.g., the security platform monitors wireless and wired interfaces including a plurality of 3GPP interfaces and a plurality of non-3GPP interfaces) associated with one or more of a Policy Control and Charging Rules Function (PCRF) entity, an Authentication, Authorization, and Accounting (AAA) server, Lightweight Directory Access Protocol (LDAP) server, or Traffic Detection Function (TDF) entity, such as also similarly described above.

At 804, associating the subscriber with the new IP flow at the security platform is performed. For example, the security platform can identify new IP flows (e.g., data calls or other sessions) and associate a subscriber and their assigned IP address with the new flow as similarly described above.

At 806, determining a security policy to apply at the security platform to the new IP flow based on the subscriber is performed. For example, the security platform can apply dynamic policy per IP flow for wireless and wired devices, in which the security platform is configured with a plurality of security policies for IP addresses associated with a plurality of subscribers using the service provider network, such as similarly described above. As another example, the security platform can be configured to infer a plurality of security policies for IP addresses associated with a plurality of subscribers using the service provider network based on one or more messages intercepted during monitoring of the network traffic on the service provider network at the security platform.

At 808, enforcing the security policy on the new IP flow using the security platform is performed. For example, the security platform can allow the new IP flow to access a resource based on the security policy. As another example, the security platform can block the new IP flow from accessing a resource based on the security policy. Various other example enforcement actions on the new IP flow can be performed by the security platform based on the security policy, such as similarly described above with respect to various embodiments and use case scenarios.

Additional example processes for the disclosed techniques for a security policy platform for service provider network environments will now be described.

Figure 9:
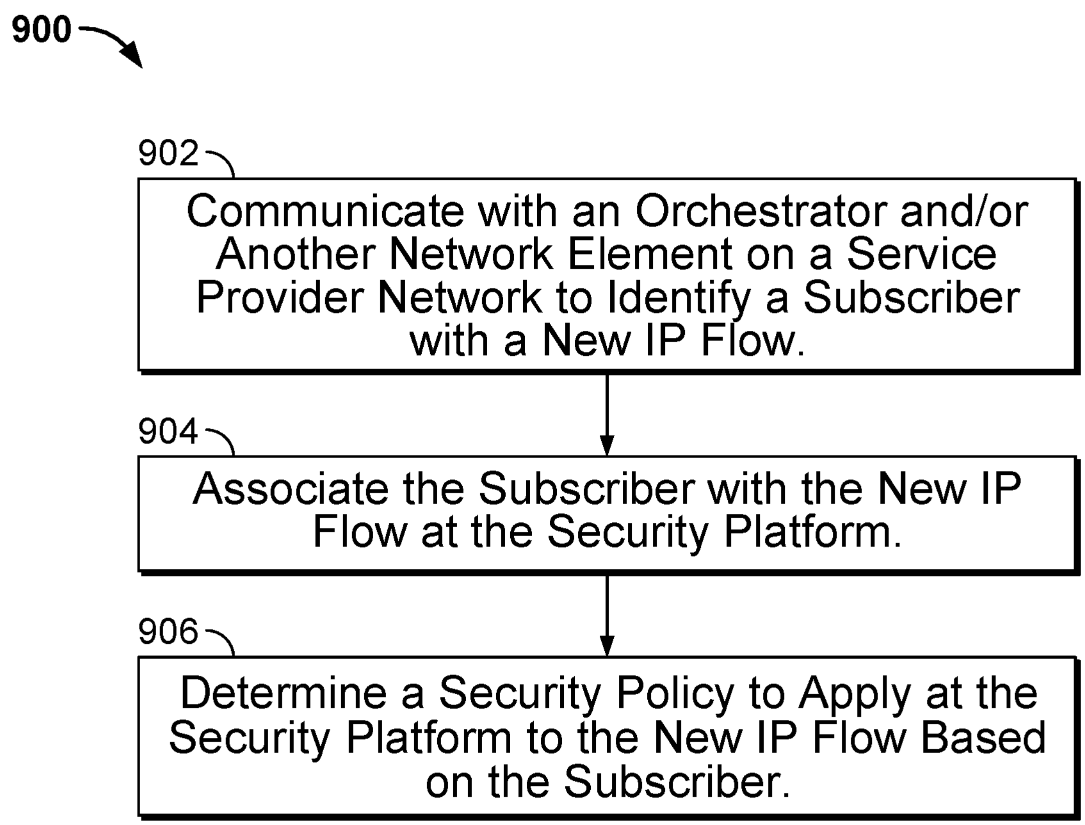
FIG. 9 is a flow diagram of a process for a security platform for service provider network environments in accordance with some embodiments.

Example Processes for a Security Platform for Service Provider Network Environments FIG. 9 is a flow diagram of a process for a security platform for service provider network environments in accordance with some embodiments. In some embodiments, a process 900 as shown in FIG. 9 is performed by the security platform and techniques as similarly described above including the embodiments described above with respect to FIGS. 3-6. In one embodiment, process 900 is performed by data appliance 500 as described above with respect to FIG. 5, network device 600 as described above with respect to FIG. 6, a virtual appliance, an SDN security solution, a cloud security service, and/or combinations or hybrid implementations of the aforementioned as described herein.

The process begins at 902. At 902, communicating with an orchestrator and/or another network element on a service provider network to identify a subscriber associated with a new IP flow using a security platform is performed. For example, the security platform can include a firewall, and the firewall applies dynamic policy per IP flow for wireless and wired devices as similarly described above.

In one embodiment, the security platform (e.g., a firewall, a network sensor acting on behalf of the firewall, or another device/component that can implement security policies) communicates with the orchestrator and/or another network element using an Application Programming Interface (API) to identify the subscriber associated with the new IP flow (e.g., to apply a plurality of security policies in real-time as data calls are setup and modified on the service provider network) as similarly described above. For example, the security platform can communicate with one or more of a Policy Control and Charging Rules Function (PCRF) entity, an Authentication, Authorization, and Accounting (AAA) server, Lightweight Directory Access Protocol (LDAP) server, or Traffic Detection Function (TDF) entity using a network protocol to identify the subscriber associated with the new IP flow, such as also similarly described above.

At 904, associating the subscriber associated with the new IP flow at the security platform is performed. For example, the security platform can identify new IP flows (e.g., data calls or other sessions) and associate a subscriber and their assigned IP address with the new flow as similarly described above.

At 906, determining a security policy to apply at the security platform to the new IP flow based on the subscriber is performed. For example, the security platform can apply dynamic policy per IP flow for wireless and wired devices, in which the firewall is configured with a plurality of security policies for IP addresses associated with a plurality of subscribers using the service provider network, such as similarly described above.

Figure 10:
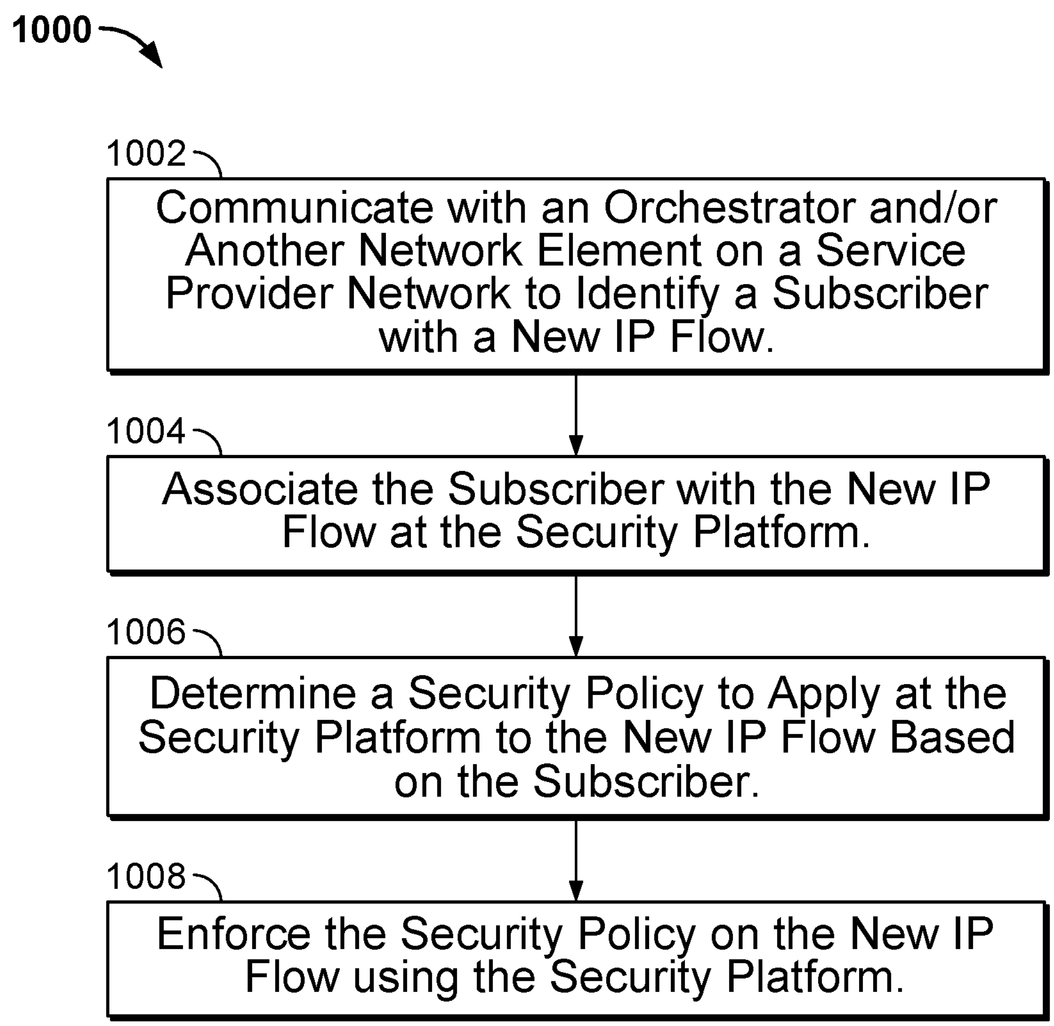
FIG. 10 is a flow diagram of a process for a security platform for service provider network environments in accordance with some embodiments.

FIG. 10 is a flow diagram of a process for a security platform for service provider network environments in accordance with some embodiments. In some embodiments, a process 1000 as shown in FIG. 10 is performed by the security platform and techniques as similarly described above including the embodiments described above with respect to FIGS. 3-6. In one embodiment, process 1000 is performed by data appliance 500 as described above with respect to FIG. 5, network device 600 as described above with respect to FIG. 6, a virtual appliance, an SDN security solution, a cloud security service, and/or combinations or hybrid implementations of the aforementioned as described herein.

The process begins at 1002. At 1002, communicating with an orchestrator and/or another network element on a service provider network to identify a subscriber associated with a new IP flow using a security platform is performed. For example, the security platform can include a firewall, and the firewall applies dynamic policy per IP flow for wireless and wired devices as similarly described above. In some cases, the security platform can also be a plurality of firewalls and a firewall manager for managing the plurality of firewalls as also similarly described above.

In one embodiment, the security platform (e.g., a firewall, a network sensor acting on behalf of the firewall, or another device/component that can implement security policies) communicates with the orchestrator and/or another network element using an Application Programming Interface (API) to identify the subscriber associated with the new IP flow (e.g., to apply a plurality of security policies in real-time as data calls are setup and modified on the service provider network) as similarly described above. For example, the security platform can communicate with one or more of a Policy Control and Charging Rules Function (PCRF) entity, an Authentication, Authorization, and Accounting (AAA) server, Lightweight Directory Access Protocol (LDAP) server, or Traffic Detection Function (TDF) entity using a network protocol to identify the subscriber associated with the new IP flow, such as also similarly described above.

At 1004, associating the subscriber associated with the new IP flow at the security platform is performed. For example, the security platform can identify new IP flows (e.g., data calls or other sessions) and associate a subscriber and their assigned IP address with the new flow as similarly described above.

At 1006, determining a security policy to apply at the security platform to the new IP flow based on the subscriber is performed. For example, the security platform can apply dynamic policy per IP flow for wireless and wired devices, in which the firewall is configured with a plurality of security policies for IP addresses associated with a plurality of subscribers using the service provider network, such as similarly described above. As another example, the security platform can be configured to infer a plurality of security policies for IP addresses associated with a plurality of subscribers using the service provider network based on one or more messages intercepted during monitoring of the network traffic on the service provider network at the security platform.

At 1008, enforcing the security policy on the new IP flow using the security platform is performed. For example, the security platform can allow the new IP flow to access a resource based on the security policy. As another example, the security platform can block the new IP flow from accessing a resource based on the security policy. Various other example enforcement actions on the new IP flow can be performed by the security platform based on the security policy, such as similarly described above with respect to various embodiments and use case scenarios.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a processor configured to:

monitor network traffic on a service provider network at a security platform to identify a subscriber of a plurality of subscribers with a new IP flow, wherein the plurality of subscribers includes a first subscriber and a second subscriber, and wherein the security platform is configured to monitor and/or communicate on one or more 3$^{rd}$ Generation Partnership Project (3GPP) related interfaces;

associate the subscriber with the new IP flow at the security platform and select a security policy to apply at the security platform to the new IP flow based on the subscriber, wherein the selecting of the security policy to apply at the security platform to the new IP flow is based on the first subscriber or the second subscriber, and wherein a first security policy associated with the first subscriber is different from a second security policy associated with the second subscriber;

apply dynamic policy per the new IP flow with the security policy for IP addresses associated with the subscriber on the service provider network based on one or more messages intercepted between network elements on a mobile core network of the service provider network during passive monitoring of the network traffic at the security platform using one or more 3GPP related interfaces, wherein the dynamic policy is applied or modified in near real-time for the subscriber without requiring one or more manual configuration changes on the security platform, and wherein the one or more manual configuration changes comprise URL filtering, and/or malware content protection; and enforce the security policy on the new IP flow using the security platform to block the new IP flow to access a resource based on the security policy; and a memory coupled to the processor and configured to provide the processor with instructions.

2. The system recited in claim 1, wherein the security platform applies dynamic policy per IP flow for wireless and wired devices.

3. The system recited in claim 1, wherein the security platform monitors wireless and wired interfaces including a plurality of 3GPP interfaces and a plurality of non-3GPP interfaces to apply a plurality of security policies in real-time as data calls are setup and modified on the service provider network.

4. The system recited in claim 1, wherein the security platform monitors network traffic associated with one or more of a Policy Control and Charging Rules Function (PCRF) entity, an Authentication, Authorization, and Accounting (AAA) server, Lightweight Directory Access Protocol (LDAP) server, or Traffic Detection Function (TDF) entity.

5. The system recited in claim 1, wherein the security platform is configured with a plurality of security policies for IP addresses associated with the plurality of subscribers using the service provider network.

6. The system recited in claim 1, wherein the security platform is configured to infer a plurality of security policies for IP addresses associated with the plurality of subscribers using the service provider network based on one or more messages intercepted during monitoring of the network traffic on the service provider network at the security platform.

7. The system recited in claim 1, wherein the processor is further configured to:

allow another new IP flow to access another resource based on the security policy.

8. A method, comprising:

monitoring network traffic on a service provider network at a security platform to identify a subscriber of a plurality of subscribers with a new IP flow, wherein the plurality of subscribers includes a first subscriber and a second subscriber, and wherein the security platform is configured to monitor and/or communicate on one or more 3rd Generation Partnership Project (3GPP) related interfaces;

associating the subscriber with the new IP flow at the security platform and selecting a security policy to apply at the security platform to the new IP flow based on the subscriber, wherein the selecting of the security policy to apply at the security platform to the new IP flow is based on the first subscriber or the second subscriber, and wherein a first security policy associated with the first subscriber is different from a second security policy associated with the second subscriber;

applying dynamic policy per the new IP flow with the security policy for IP addresses associated with the subscriber on the service provider network based on one or more messages intercepted between network elements on a mobile core network of the service provider network during passive monitoring of the network traffic at the security platform using one or more 3GPP related; interfaces, wherein the dynamic policy is applied or modified in near real-time for the subscriber without requiring one or more manual configuration changes on the security platform, and wherein the one or more manual configuration changes comprise URL filtering, and/or malware content protection; and enforcing the security policy on the new IP flow using the security platform to block the new IP flow to access a resource based on the security policy.

9. The method of claim 8, wherein the security platform applies dynamic policy per IP flow for wireless and wired devices.

10. The method of claim 8, wherein the security platform monitors wireless and wired interfaces including a plurality of 3GPP interfaces and a plurality of non-3GPP interfaces to apply a plurality of security policies in real-time as data calls are setup and modified on the service provider network.

11. The method of claim 8, wherein the security platform monitors network traffic associated with one or more of a Policy Control and Charging Rules Function (PCRF) entity, an Authentication, Authorization, and Accounting (AAA) server, Lightweight Directory Access Protocol (LDAP) server, or Traffic Detection Function (TDF) entity.

12. The method of claim 8, wherein the security platform is configured with a plurality of security policies for IP addresses associated with the plurality of subscribers using the service provider network.

13. The method of claim 8, wherein the security platform is configured to infer a plurality of security policies for IP addresses associated with the plurality of subscribers using the service provider network based on one or more messages intercepted during monitoring of the network traffic on the service provider network at the security platform.

14. The method of claim 8, further comprising:

allowing another new IP flow to access another resource based on the security policy.

15. A computer program product, the computer program product being embodied in a non-transitory tangible computer readable medium and comprising computer instructions for:

monitoring network traffic on a service provider network at a security platform to identify a subscriber of a plurality of subscribers with a new IP flow, wherein the plurality of subscribers includes a first subscriber and a second subscriber, and wherein the security platform is configured to monitor and/or communicate on one or more $3^{rd}$ Generation Partnership Project (3GPP) related interfaces;

associating the subscriber with the new IP flow at the security platform and selecting a security policy to apply at the security platform to the new IP flow based on the subscriber, wherein the selecting of the security policy to apply at the security platform to the new IP flow is based on the first subscriber or the second subscriber, and wherein a first security policy associated with the first subscriber is different from a second security policy associated with the second subscriber;

applying dynamic policy per the new IP flow with the security policy for IP addresses associated with the subscriber on the service provider network based on one or more messages intercepted between network elements on a mobile core network of the service provider network during passive monitoring of the network traffic at the security platform using one or more 3GPP related; interfaces, wherein the dynamic policy is applied or modified in near real-time for the subscriber without requiring one or more manual configuration changes on the security platform, and wherein the one or more manual configuration changes comprise URL filtering, and/or malware content protection; and enforcing the security policy on the new IP flow using the security platform to allow the new IP flow to access a resource based on the security policy.

16. The computer program product recited in claim 15, wherein the security platform applies dynamic policy per IP flow for wireless and wired devices.

17. The computer program product recited in claim 15, wherein the security platform monitors wireless and wired interfaces including a plurality of 3GPP interfaces and a plurality of non-3GPP interfaces to apply a plurality of security policies in real-time as data calls are setup and modified on the service provider network.

18. The computer program product recited in claim 15, wherein the security platform is configured with a plurality of security policies for IP addresses associated with the plurality of subscribers using the service provider network.

19. The computer program product recited in claim 15, wherein the security platform is configured to infer a plurality of security policies for IP addresses associated with the plurality of subscribers using the service provider network based on one or more messages intercepted during monitoring of the network traffic on the service provider network at the security platform.

20. The computer program product recited in claim 15, further comprising computer instructions for:

allowing another new IP flow to access another resource based on the security policy.

* * * * *

UNITED STATES PATENT AND TRADEMARK OFFICE

CERTIFICATE OF CORRECTION

PATENT NO. : 11,233,829 B2
APPLICATION NO. : 16/748629
DATED : January 25, 2022
INVENTOR(S) : Mitchell Rappard and Leonid Burakovsky It is certified that error appears in the above-identified patent and that said Letters Patent is hereby corrected as shown below:

In the Claims

In Column 19, Line(s) 58, Claim 8, after "related", delete ";".
In Column 20, Line(s) 58, Claim 15, after "related", delete ";".

Signed and Sealed this
Twelfth Day of September, 2023

Katherine Kelly Vidal

Katherine Kelly Vidal
*Director of the United States Patent and Trademark Office*